June 17, 1952     B. M. MATHIAS     2,600,897
DRIVE MOTOR CONTROL FOR ENGINE ELECTRIC DRIVEN VEHICLES
Filed April 8, 1949     2 SHEETS—SHEET 1
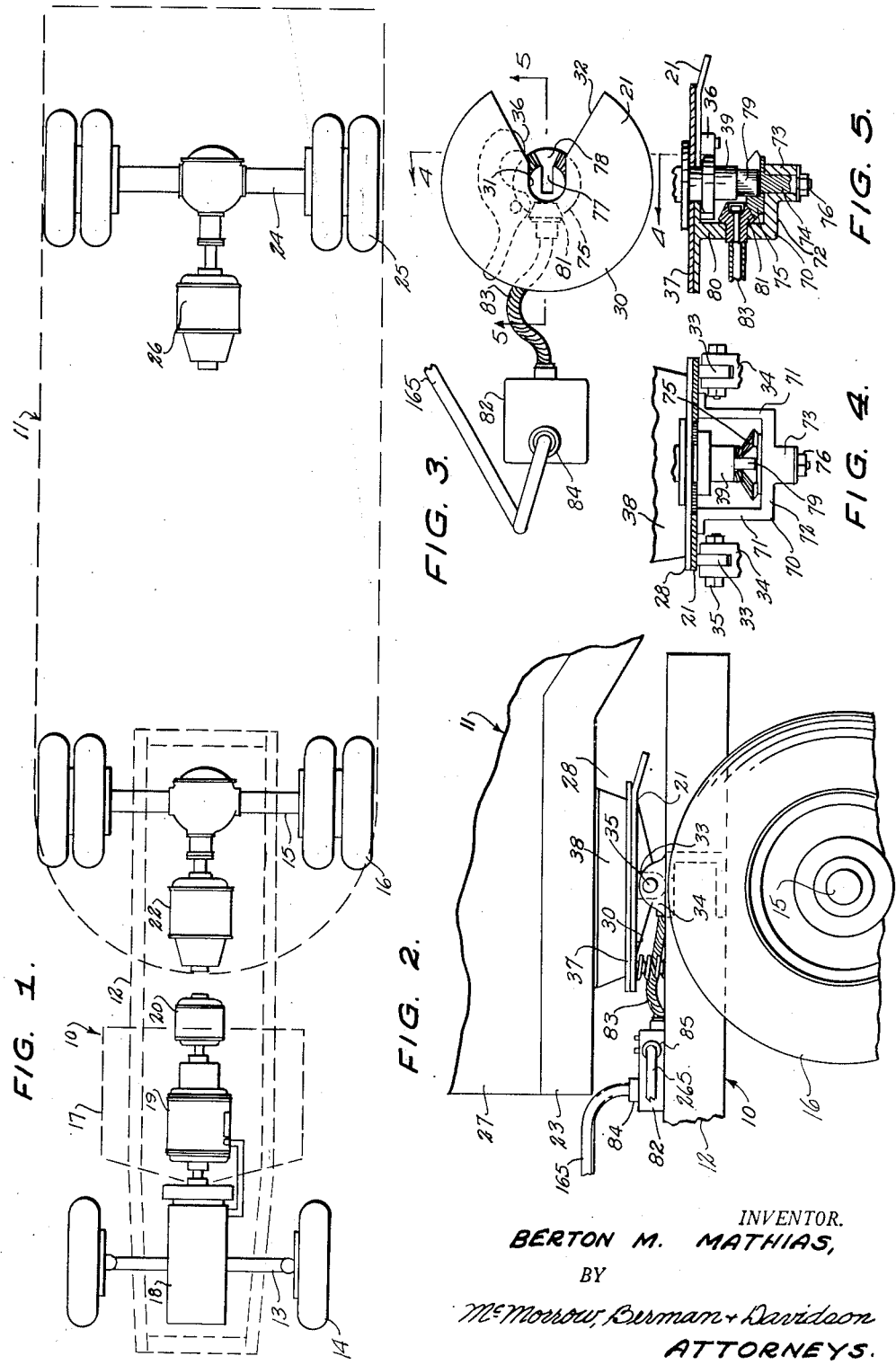
INVENTOR.
BERTON M. MATHIAS,
BY
McMorrow, Berman + Davidson
ATTORNEYS.

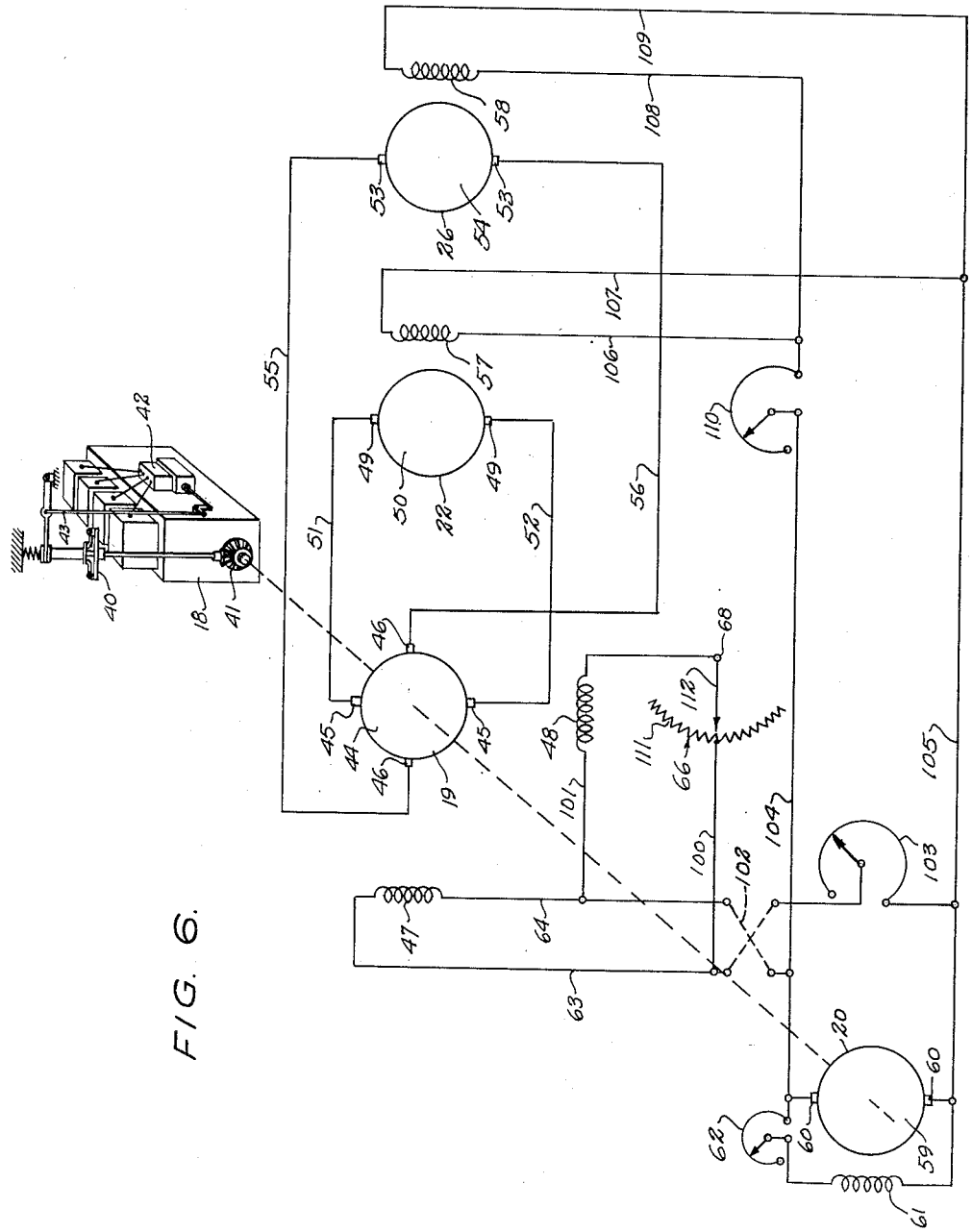

Patented June 17, 1952

2,600,897

UNITED STATES PATENT OFFICE 2,600,897

DRIVE MOTOR CONTROL FOR ENGINE ELECTRIC DRIVEN VEHICLES

Berton M. Mathias, Monte Vista, Colo.

Application April 8, 1949, Serial No. 86,344

4 Claims. (Cl. 180—14)

This invention relates to motor controls for an electric vehicle transmission, and more particularly to a control for the drive motor of the trailer component of a tractor-trailer vehicle, and constitutes a continuation-in-part of my prior application, now abandoned, Serial No. 80,222, filed March 8, 1949.

Many heavy vehicles now in use are equipped with internal combustion engines, particularly of the diesel engine type, with engine-driven electric current generators, wheel or axle-driving motors and means including manual controls electrically connecting the generator to the motors. Frequently such vehicles are equipped with governor-controlled diesel engines which operate at a substantially constant speed, but at varying power output, and the speed of the vehicle is controlled by regulating the current supplied to the driving motors by the engine-driven generator. In the case of a large tractor-trailer vehicle equipped with one or more drive motors on the tractor, it is conceived that material advantage can be obtained by providing a drive axle at the rear end of the trailer component of the vehicle and drivingly connecting a trailer drive or "booster" motor to such drive axle to apply vehicle-driving power at the rear end of such a vehicle. Such trailer components may include both full and semi-trailers and such devices as electrically driven earth-moving semi-tractors used with electric driven trailers. This is of maximum advantage when the vehicle is used on steep grades, and on uneven road surfaces. It is futher conceived that where such a trailer or "booster" motor is used, its power must be accurately and positively controlled, so that it does not tend, at any time, to cause the trailer component to over-run the tractor component of the vehicle, particularly when the vehicle is rounding a curve or making a turn.

It is, therefore, among the objects of the invention to provide an improved engine-electric drive for a tractor-trailer road vehicle including a "booster" drive motor driving the wheels of the trailer component of the vehicle, and control means including a "booster" motor-power control responsive to the angular relationship between the tractor and trailer components of the vehicle to decrease the "booster" motor power in response to increase of angularity between the vehicle components, and increase the "booster" motor power in response to decrease of angularity between the vehicle components, which motor-power control is carried by one of the vehicle components and operated by the other, does not interfere, in any way, with coupling and uncoupling vehicle components, and is automatically conditioned for operation when the trailer component is coupled to the tractor component of the vehicle, does not require any material modification of the vehicle structure for its installation, and which is simple and durable in construction, economical to manufacture and install, and fully automatic in operation.

Other objects and advantages will become apparent from a consideration of the following description and the appended claims in conjunction with the accompanying drawings, wherein:

Figure 1 is a diagrammatic top plan view of an engine-electric driven, tractor-trailer vehicle of a type to which the device of the invention can be advantageously applied;

Figure 2 is a side elevation of a fragmentary portion of the vehicle illustrated in Figure 1 showing the fifth wheel connection between the tractor and trailer components of the vehicle, and a motor-control unit illustrative of the invention mounted on the tractor component of the vehicle and operated by the two rotatably associated parts of the fifth-wheel assembly upon turning of one of the vehicle components relative to the other;

Figure 3 is a top plan view of the tractor component-carried fifth wheel and the control apparatus of the invention;

Figure 4 is a transverse cross-section on the line 4—4 of Figure 3;

Figure 5 is a transverse cross-section on the line 5—5 of Figure 3; and

Figure 6 is a diagrammatic illustration of the power generating and drive-unit components and the connections between these components, illustrating various power controls and showing the location of the control device of the application in the power-control circuit.

With continued reference to the drawings, the vehicle, as illustrated in Figures 1 and 2, comprises a tractor component, generally indicated at 10, and a trailer component, generally indicated at 11.

The tractor component 10 may be of known or conventional construction, and comprises a frame 12 mounted upon a front, steering axle 13 supported by front wheels 14, and rear drive wheels 16. The frame supports the cab 17, an internal combustion engine 18, an engine-driven main generator 19, a motor field-exciting generator 20, and a tractor-carried component 21 of a fifth-wheel assembly which pivotally couples the front end of the trailer component 11 to the rear end of the tractor component 10. The tractor component also includes a drive motor 22 drivingly connected to the rear drive axle 15 and electrically connected to the main generator 19 and the auxiliary, field-exciting generator 20.

The trailer component includes an elongated frame 23 supported near its rear end on a rear drive axle 24, which drive axle is supported by the rear trailer wheels 25 and to which a trailer-driving motor 26 is drivingly connected. The frame supports the trailer body 27 and carries, near its front end, the trailer component 28 of the fifth-wheel assembly.

The fifth-wheel assembly may be of entirely conventional construction and, in the arrangement illustrated, includes a tractor-carried circular plate 30 having a central, circular aperture 31, and a sector-shaped opening 32 extending rearwardly from the central aperture 31. This plate is mounted for pivotal movement about an axis transverse to the tractor frame by suitable plate-carried lugs 33 pivotally connected to tractor frame-carried lugs 34 by respective pivot pins or bolts 35, and this plate carries manually-releasable locking means 36 of conventional construction for locking the tractor and trailer components of a vehicle together.

The trailer-carried component of the fifth-wheel assembly includes a circular plate 37 secured in position below the trailer frame near the front end of the latter by a suitable web structure 38, and a shouldered pin 39 which extends from the trailer frame through the plate 37 and is movable into the central aperture 31 in the tractor-carried plate 30 through the sector-shaped opening 32 in the tractor-carried plate. When the pin 39 is in the aperture 31, the latch means 36 locks the pin in the plate 30 from which it can be removed only when the lock means is manually released.

Figure 6 diagrammatically illustrates, in simplified form, a suitable power-control system electrically connecting the generators 19 and 20 to the motors 22 and 26. This power-control system may be any one of various known or desired systems and may include various features which have been omitted from the diagrammatic showing in Figure 6 for the purpose of simplifying the illustration.

In the arrangement illustrated, the engine 18 is represented as a diesel type, internal-combustion engine having a speed-controlling governor 40 driven from the engine by suitable gearing, such as that indicated at 41, and operatively connected to the engine fuel-injection pump 42 by suitable link-and-lever system, as indicated at 43. The governor may be set for a predetermined speed, or may be manually adjustable for operation of the engine at various selected speeds within a predetermined speed range.

The main generator 19, driven by the engine 18, may be of any known or desired construction, and may have separately excited field coils energized by a battery or by the auxiliary generator 20, or coils for both methods of excitation, in addition to its main coil windings which may be in shunt of its rotor or in series with the rotor or arranged in both shunt and series. These various forms of generators are well known to the art, and any desired form may be selected without, in any way, exceeding the scope of the invention.

In the arrangement illustrated, the main generator 19 has a rotor 44 equipped with two separate sets of brushes 45 and 46 and with two respective main field windings 47 and 48. The set of generator brushes 45 are connected to corresponding brushes 49 associated with the rotor 50 of the tractor motor 22 by the conductors 51 and 52 and the set of generator brushes 46 is connected to the brushes 53 associated with the rotor 54 of the trailer motor 26 by the conductors 55 and 56.

The tractor motor 22 has a field winding 57, the trailer motor 26 has a field winding 58 and the field exciting generator 20 has a rotor 59 equipped with a pair of brushes 60 and a field winding 61. The field winding 61 is shown as connected in shunt of the rotor brushes 60 of the field exciting generator and a variable resistance unit 62 is interposed between the field winding 61 and one of the brushes 60 to regulate the excitation of this field winding.

The brushes 60 of field exciting generator are connected to respectively opposite ends of the main generator field winding 47 by conductors 63 and 64 and to the respectively opposite ends of main generator field winding 48 by conductors 100 and 101 leading from the conductors 63 and 64 respectively. A reversing switch 102 is interposed in the conductors 63 and 64 between the connections between these conductors and the conductors 100 and 101 and the generator brushes 60 to simultaneously reverse the exciting current through both main generator field windings 47 and 48 and thereby reverse the operation of both motors 22 and 26 by reversing the direction of the energizing direct current applied thereto. This will permit reversal of the direction of travel of the generator and motor equipped vehicle when desired.

A variable resistance unit 103 is interposed between one side of the reversing switch 102 and the corresponding brush 60 of the field exciting generator to regulate the strength of excitation of the main generator field windings 47 and 48 thereby controlling the output voltage of the main generator to the motors 22 and 26, and regulating the speed of the motors.

Conductors 104 and 105 extend respectively from the brushes of the field exciting generator and the conductors 63 and 64 are shown connected to the generator brushes 60 through these conductors 104 and 105 respectively. Conductors 106 and 107 lead from conductors 104 and 105 respectively to the opposite ends of the tractor motor field winding 57 and similar conductors 108 and 109 lead from the conductors 104 and 105 to the field winding 58 of the trailer motor 26.

A variable resistance unit 110 is interposed in the conductor 104 between both motor field windings 57 and 58 and the corresponding field exciting generator brush 60 to regulate the strength of excitation of the motor field windings thereby providing, if desired, an additional means to further vary the speed of these motors, the conductor 63 being connected to the conductor 104 between the variable resistance unit 110 and the corresponding brush 60 so that the resistance unit 110 does not offset the excitation of the main generator field windings 47 and 48.

A variable resistance unit 66, the resistance of which varies in accordance with the degree of angularity between the tractor and trailer components of the vehicle, is interposed in the conductor 100 leading to one end of the main generator field winding 48 which corresponds to the set of main generator brushes 46 from which the trailer motor 26 is energized.

The variable resistance unit 66 is automatically operated by changes in both directions of the angularity between the tractor and trailer components of the vehicle to progressively decrease the strength of excitation of the main generator field 48 upon decrease of the angle between the longitudinal center lines of the pivotally connected vehicle components below 180 degrees to thereby progressively decrease the driving effort of the trailer motor 26, the motor effort being reduced substantially to zero at some predetermined angle greater than 90 degrees.

As shown in Figure 6 the variable resistance unit 66 comprises an elongated resistance element 111 and a contactor 112 slidable along the resistance element from one end to the other and disposed substantially at the mid-length location of the resistance element when the longitudinal center lines of the two vehicle components are in longitudinal alignment with an angle of 180 degrees between them. One end of the conductor 100 is connected to the resistance element 111 substantially at the mid-length location of the latter and the other end of this conductor is connected to the slide 112.

The variable resistance unit 66 may be provided in different forms, so that it will be operated in the above-indicated manner by relative turning movements betwen the vehicle tractor and trailer components, one practical arrangement being particularly illustrated in Figures 2, 3, 4 and 5 by way of example.

As illustrated in Figures 2, 3, 4 and 5, a U-shaped bracket 70 is secured to the underside of the tractor-carried fifth-wheel plate 21 and depends from this plate with its legs 71 in a plane substantially perpendicular to the plate and including a line passing perpendicularly to the plate through the center of the aperture 31 and the axes of the pivotal connections between the plate lugs 33 and frame-carried lugs 34. The bight portion 72 of this bracket is provided at its mid-length portion with a cylindrical bearing sleeve 73 in which is journaled the cylindrical hub 74 of a beveled gear 75 which rests upon the upper surface of the bight portion 72 of the bracket and is held in contact with this bracket surface by a nut 76 threaded onto the gear hub 74 at the bottom end of bearing sleeve 73. This gear 75 has an elongated notch 77 in the upper portion thereof opening at one end through a sector-shaped opening 78 in the beveled portion of the gear, and the trailer-carried pivot pin 39 is provided on its bottom end with a key 79 which fits into the notch 77 when the trailer component is coupled to the tractor component of the vehicle. As the pin 39 is fixed relative to the trailer component of the vehicle, the gear 75 will be rotated in the bracket 70 whenever the trailer component turns relative to the tractor component of the vehicle.

The bracket 70 is provided with a bearing arm 80 between the legs 71, and disposed forwardly of the pin 39 and a beveled pinion 81 is journaled in the bearing arm 80 and meshes with the beveled gear 75.

A double or oppositely-acting, variable resistance unit, such as that diagrammatically shown in Figure 6 at 66, is mounted in a suitable housing 82 secured on the tractor frame 12, and this unit is operatively connected to the beveled pinion 81 by an encased flexible shaft 83, or by other suitable torque-transmitting means.

The portion of the conductor 100 between the variable resistance unit 66 and the generator field winding 48 is provided as a cable 165 having on one end a plug coupling which may be plugged into a receptacle 84 mounted in the housing 82 and electrically connected to the center point 68 of the variable resistance unit. This cable 165 extends from the receptacle 84 to a connection with the appropriate end of the generator field winding 48. The other portion of the conductor 100 is provided as a cable 265 which leads from a suitable receptacle 85 in the housing 82 to the manually-operated, reversing switch 102, preferably mounted in the cab of the tractor component of the vehicle.

With this arrangement, whenever the tractor component of the vehicle turns or swings relative to the trailer component, the beveled gear 75 will be rotated by the pin 39 relative to the tractor component, and will rotate the beveled pinion 81 which will, in turn, operate the variable resistance unit contained in the housing 82 to interpose in the energizing circuit for the field winding 48, a resistance which progressively increases with decrease in angularity between the tractor and trailer components of the vehicle below 180 degrees and progressively decreases with increase in the angularity between the vehicle tractor and trailer components from an angle smaller than up to an angle of 180 degrees.

The variable resistance unit 66 is so constructed that at a predetermined angular relationship of the tractor component to the trailer component, greater than 90 degrees, the energizing circuit to the motor 26 will be substantially discontinued, thereby discontinuing the driving effort of the trailer-driving motor 26 until the angularity between the tractor and trailer components of the vehicle is increased. The tractor will, of course, be powered at all times with the tractor-driving motor 22 and will apply the necessary tractive force to the trailer to continue operation of the vehicle.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In an engine-electric driven vehicle including a tractor component, a trailer component pivotally connected near its front end to the tractor component near the rear end of the latter, an engine-driven generator, a tractor-driving motor, a trailer-driving motor, and a control system for said generator and said motors, means incorporated in said control system and responsive to angular movements between said tractor and trailer components for progressively reducing the power output of said trailer-driving motor below the power output of said tractor-driving motor in response to decrease in the angle between said vehicle components, and for increasing the power output of said trailer-driving motor toward the power output of said tractor-driving motor in response to increase in the angle between said vehicle components up to an angle of 180 degrees, said means comprising a double-acting, variable resistance unit carried on said trailer component and connected into that part of the control system controlling said trailer-driving motor, a beveled gear carried by said tractor component and rotated by said trailer component through the pivotal connection between said components, a beveled pinion meshing with said beveled gear, and a torque-transmitting drive means between said beveled pinion and said variable resistance unit.

2. In an engine electric driven vehicle including a tractor component carrying an engine and an engine driven generator, a trailer component mounted at its front end on the rear end of said tractor component, a fifth wheel assembly disposed between said tractor and trailer components and providing a pivotal connection therebetween, a tractor driving motor carried by said tractor component, a trailer driving motor carried by said trailer component and wiring systems connecting said generator to said driving motors, means for varying the power of said trailer driving motor in response to variations in the angularity between said vehicle components comprising a motor power controlling variable resistance unit connected into the wiring system connecting said generator to said trailer driving motor, a first gear mounted in said fifth wheel assembly and connected to said trailer component for rotation by the latter relative to said tractor component upon change in the angularity between said vehicle components, a second gear carried by said tractor component and meshing with said first gear for rotation thereby when said first gear is rotated relative to said tractor component, and flexible drive means connecting said second gear to said variable resistance unit to operate the latter by rotation of said second gear, the connection between said gears and said variable resistance unit being such that the power of said trailer driving motor is decreased with decrease in the angularity between said vehicle components and increased with increase in the angularity between said vehicle components up to a condition in which said components are in longitudinal alignment with each other.

3. In an engine electric driven vehicle including a tractor component carrying an engine and an engine driven generator, a trailer component mounted at its front end of the rear end of said tractor component, a fifth wheel assembly disposed between said tractor and trailer components and providing a pivotal connection therebetween, a tractor driving motor carried by said tractor component, a trailer driving motor carried by said trailer component and wiring systems connecting said generator to said driving motors, means for varying the power of said trailer driving motor in response to variations in the angularity between said vehicle components comprising a motor power controlling variable resistance unit connected into the wiring system connecting said generator to said trailer driving motor, a first gear mounted in said fifth wheel assembly and connected to said trailer component for rotation by the latter relative to said tractor component upon change in the angularity between said vehicle components, a second gear carried by said tractor component and meshing with said first gear for rotation thereby when said first gear is rotated relative to said tractor component, and flexible drive means connecting said second gear to said variable resistance unit to operate the latter by rotation of said second gear, the connection between said gears and said variable resistance unit being such that the power of said trailer driving motor is decreased with decrease in the angularity between said vehicle components and increased with increase in the angularity between said vehicle components up to a condition in which said components are in longitudinal alignment with each other, said first gear comprising a sector gear having an opening extending from the center to the periphery thereof for the passage therethrough of the fifth wheel coupling pin when said vehicle components are coupled or uncoupled.

4. In an engine electric driven vehicle including a tractor component carrying an engine and an engine driven generator, a trailer component mounted at its front end on the rear end of said tractor component, a fifth wheel assembly disposed between said tractor and trailer components and providing a pivotal connection therebetween, a tractor driving motor carried by said tractor component, a trailer driving motor carried by said trailer component and wiring systems connecting said generator to said driving motors, means for varying the power of said trailer driving motor in response to variations in the angularity between said vehicle components comprising a motor power controlling variable resistance unit connecting into the wiring system connecting said generator to said trailer driving motor, a first gear mounted in said fifth wheel assembly and connected to said trailer component for rotation by the latter relative to said tractor component upon change in the angularity between said vehicle components, a second gear carried by said tractor component and meshing with said first gear for rotation thereby when said first gear is rotated relative to said tractor component, and flexible drive means connecting said second gear to said variable resistance unit to operate the latter by rotation of said second gear, the connection between said gears and said variable resistance unit being such that the power of said trailer driving motor is decreased with decrease in the angularity between said vehicle components and increased with increase in the angularity between said vehicle components up to a condition in which said components are in longitudinal alignment with each other, said fifth wheel assembly including a coupling pin carried by said trailer component and having a flattened portion, and said first gear having a radially disposed slot therein receiving the flattened portion of said coupling pin to provide a driving connection between said trailer component and said first gear.

BERTON M. MATHIAS.

REFERENCES CITED

The following references are of record in the file of this patent:

UNITED STATES PATENTS

| Number | Name | Date |
|---|---|---|
| 1,874,604 | Roche | Aug. 30, 1932 |
| 2,140,109 | Kellar | Dec. 13, 1938 |

FOREIGN PATENTS

| Number | Country | Date |
|---|---|---|
| 236,467 | Great Britain | July 9, 1925 |